(12) United States Patent
Matsuki

(10) Patent No.: US 9,753,567 B2
(45) Date of Patent: Sep. 5, 2017

(54) ELECTRONIC MEDIUM DISPLAY DEVICE THAT PERFORMS PAGE TURNING IN RESPONSE TO USER OPERATION PRESSING SCREEN, PAGE TURNING METHOD, AND PROGRAM

(75) Inventor: Tomoaki Matsuki, Tokyo (JP)

(73) Assignee: KDDI CORPORATION, Tokyo (JP)

( * ) Notice: Subject to any disclaimer, the term of this patent is extended or adjusted under 35 U.S.C. 154(b) by 133 days.

(21) Appl. No.: 14/342,973

(22) PCT Filed: Sep. 5, 2012

(86) PCT No.: PCT/JP2012/072567
§ 371 (c)(1),
(2), (4) Date: Jun. 30, 2014

(87) PCT Pub. No.: WO2013/035724
PCT Pub. Date: Mar. 14, 2013

(65) Prior Publication Data
US 2014/0362016 A1    Dec. 11, 2014

(30) Foreign Application Priority Data

Sep. 8, 2011   (JP) .................................. 2011-196043

(51) Int. Cl.
*G06F 3/041* (2006.01)
*G06F 3/0488* (2013.01)
(Continued)

(52) U.S. Cl.
CPC ............ *G06F 3/0414* (2013.01); *G06F 3/041* (2013.01); *G06F 3/0483* (2013.01);
(Continued)

(58) Field of Classification Search
None
See application file for complete search history.

(56) References Cited

U.S. PATENT DOCUMENTS 8,803,817 B1 *  8/2014  Froment ................... G06F 9/50
                                                    345/1.1
2004/0026605 A1 *  2/2004  Lee ........................ G06F 1/1615
                                                    250/221

(Continued)

FOREIGN PATENT DOCUMENTS

JP      A-4-87226     3/1992
JP      A-8-76926     3/1996

(Continued)

OTHER PUBLICATIONS

Japanese Office Action issued in Japanese Patent Application No. 2011-196043 on Dec. 4, 2013 (with translation).

(Continued)

*Primary Examiner* — Kent Chang
*Assistant Examiner* — Nathan Brittingham
(74) *Attorney, Agent, or Firm* — Oliff PLC

(57) ABSTRACT

A method is disclosed of successively displaying pages of an electronic book by one or more pages each time on a display screen, and turning the pages on the screen in response to a user's input via finger touch of the screen. This method includes: upon the user's soft touch on the screen with the finger with an intensity below a predetermined value, selecting a page turn direction based on at least one of a position at which the soft touch was performed with the finger, and a direction of the finger's movement after the soft touch; and upon the selection being followed by the user's hard touch on the screen with the finger with an intensity above the predetermined value, authorizing initiation of a page turn event for turning the pages on the screen in the selected page-turn-direction.

19 Claims, 9 Drawing Sheets

(51) Int. Cl.
  *G06F 3/0483* (2013.01)
  *G06F 3/0481* (2013.01)
  *G06F 3/0484* (2013.01)

(52) U.S. Cl.
  CPC ........ *G06F 3/0488* (2013.01); *G06F 3/04817* (2013.01); *G06F 3/04842* (2013.01); *G06F 2203/04105* (2013.01)

(56) References Cited

U.S. PATENT DOCUMENTS

| | | | |
|---|---|---|---|
| 2008/0189608 A1* | 8/2008 | Nurmi | G06F 17/241 715/273 |
| 2009/0106688 A1* | 4/2009 | Keohane | G06F 3/04855 715/786 |
| 2009/0183098 A1* | 7/2009 | Casparian | G06F 3/0238 715/765 |
| 2009/0237367 A1* | 9/2009 | Ryu | G06F 3/0483 345/173 |
| 2010/0137031 A1* | 6/2010 | Griffin | G06F 3/0482 455/566 |
| 2011/0050594 A1* | 3/2011 | Kim | G06F 3/04847 345/173 |
| 2011/0102345 A1 | 5/2011 | Kim et al. | |
| 2011/0310058 A1* | 12/2011 | Yamada | G06F 3/0488 345/174 |
| 2012/0098836 A1* | 4/2012 | Kim | G06F 3/0483 345/473 |
| 2012/0159373 A1* | 6/2012 | Archer | G06F 3/048 715/776 |
| 2012/0274662 A1* | 11/2012 | Kim | G06F 3/0488 345/650 |

FOREIGN PATENT DOCUMENTS

| | | | | |
|---|---|---|---|---|
| JP | 2003157134 A | 5/2003 | | |
| JP | 2004-078957 A | 3/2004 | | |
| JP | A-2007-18095 | 1/2007 | | |
| JP | 2007-158638 A | 6/2007 | | |
| JP | WO 2010098118 A1 * | 2/2010 | ............. | G06F 4/041 |
| JP | A-2010-185919 | 8/2010 | | |
| JP | A-2010-244514 | 10/2010 | | |
| WO | 2010/032598 A1 | 3/2010 | | |
| WO | 2011/028944 A1 | 3/2011 | | |
| WO | 2011/081882 A2 | 7/2011 | | |

OTHER PUBLICATIONS

International Search Report issued in International Application No. PCT/JP2012/072567 on Oct. 30, 2012 (with translation).
International Preliminary Report on Patentability issued in International Application No. PCT/JP2012/072567 on Mar. 12, 2014 (with translation).
Jul. 17, 2015 Office Action issed in Japanese Patent Application No. 2014-191679.
Feb. 3, 2016 Office Action issued in Japanese Application No. 2014-191679.

* cited by examiner

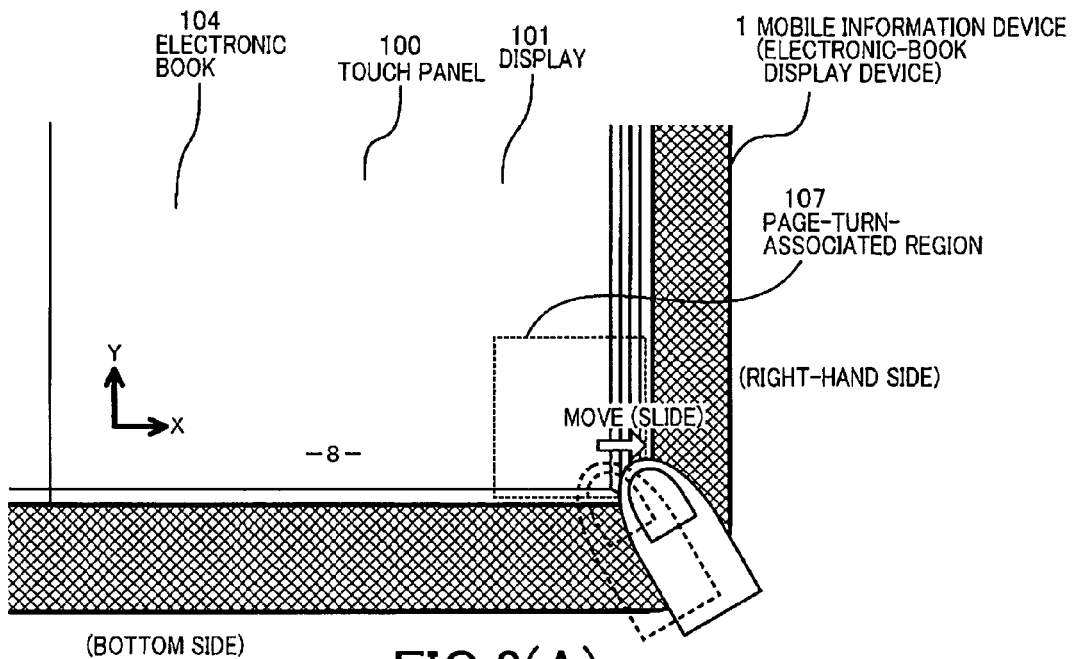
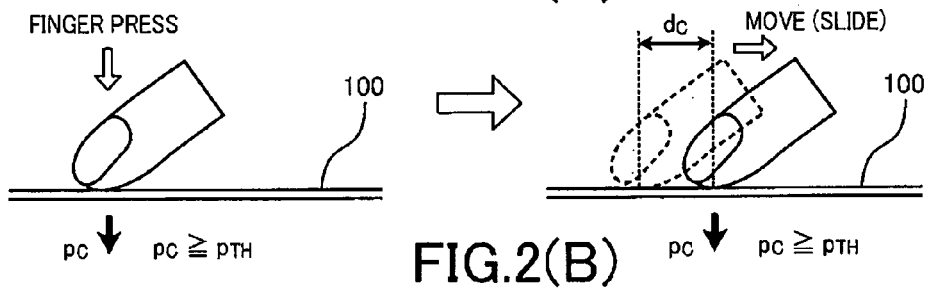
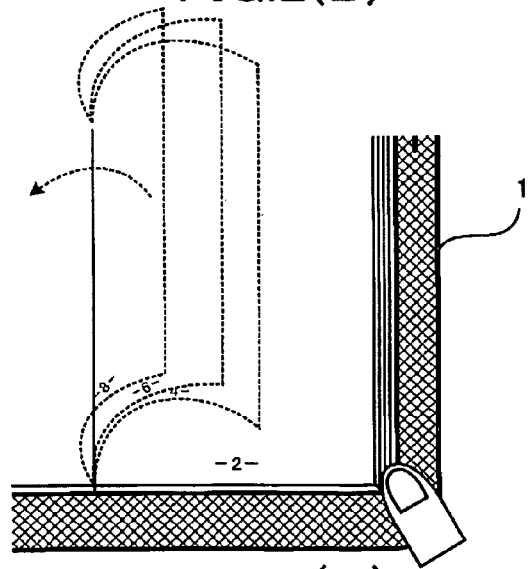
FIG.2(A)
FIG.2(B)
FIG.2(C)

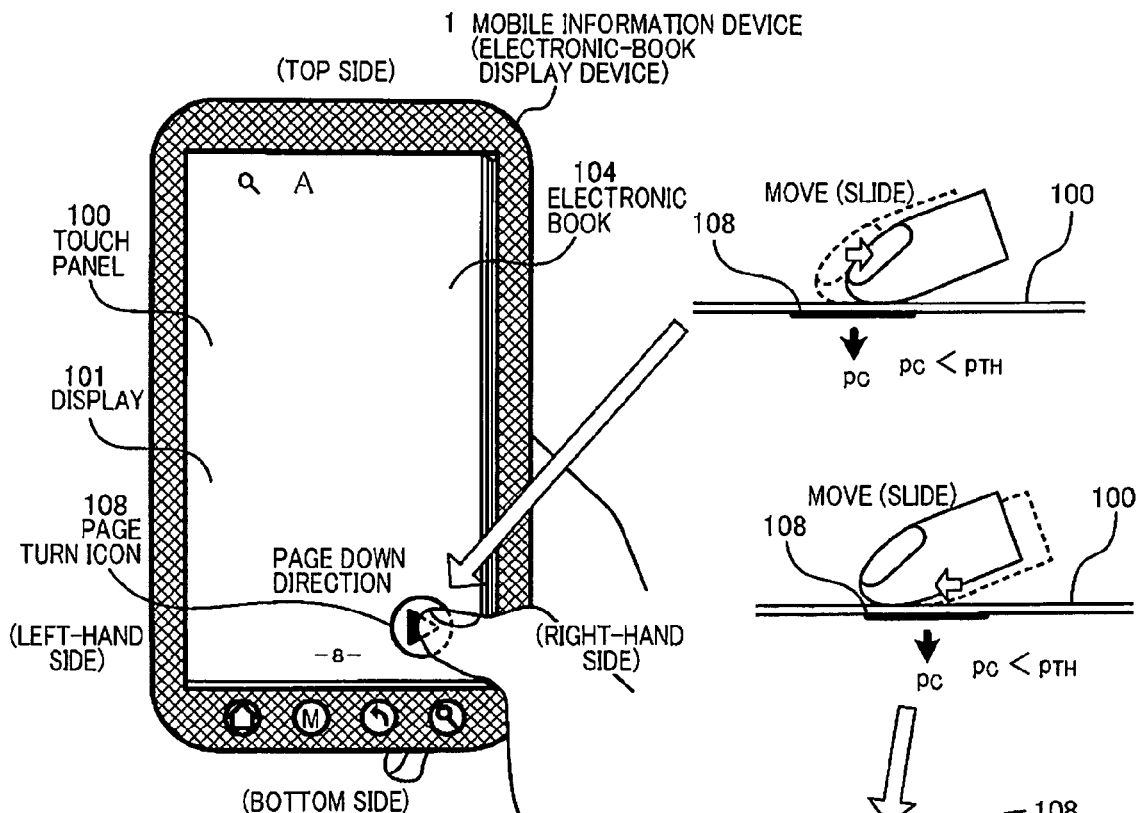
FIG.4(A)
FIG.4(B)
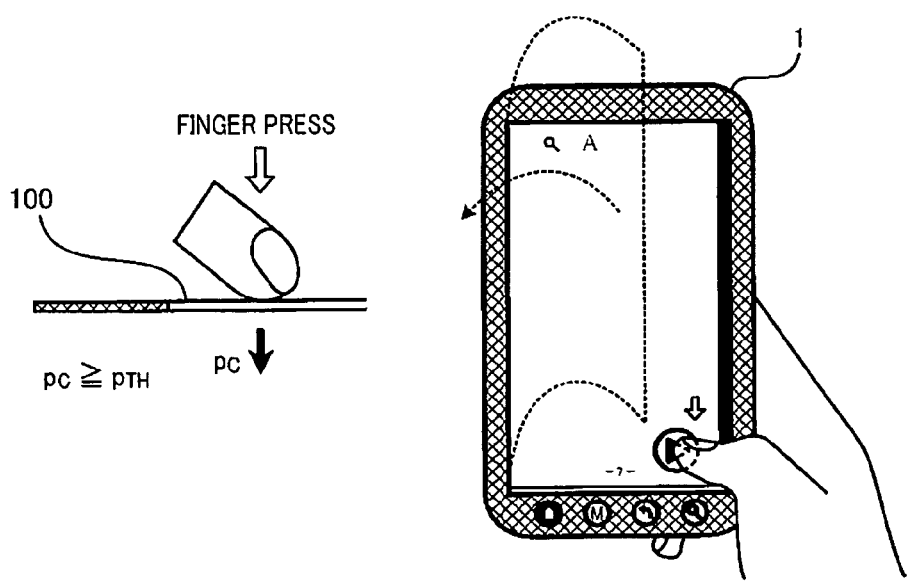
FIG.4(C)

ELECTRONIC MEDIUM DISPLAY DEVICE THAT PERFORMS PAGE TURNING IN RESPONSE TO USER OPERATION PRESSING SCREEN, PAGE TURNING METHOD, AND PROGRAM

TECHNICAL FIELD

The invention relates to techniques of successively displaying a plurality of pages of an electronic book by one or more pages each time on a touch screen, and turning the pages on a display screen in response to a user's motion on the touch screen.

This application claims under the Paris Convention the benefit of the priority of Japanese Patent Application No. 2011-196043 filed on 8 Sep. 2011, which is hereby incorporated by reference herein in its entirety for the purposes of PCT Rule 20.6.

BACKGROUND ART

Currently, in place of a paper publication such as a book, a magazine, a newspaper, etc., an electronic book has attracted attention and has increasingly proliferated. An electronic book is an electronic medium that allows the content of each page to be displayed on a display screen of a display unit of an electronic-book display device, enabling a user to read the content of the electronic medium. An electronic-book display device includes terminal equipment exclusively designed for displaying electronic books, such as an electronic-book reader, and a mobile information device having multiple functions one of which is to display electronic books, such as a smart phone, a tablet computer, etc.

Patent Document No. 1 discloses an electronic display device as an example for use in an electronic book, in which there are a display screen and an outer frame disposed outside of the display screen, wherein the outer frame is locally occupied with a grip intended to be held by a user with a hand, and the grip is equipped with a touch sensor manipulated by the user with a finger of the hand. This electronic display device allows the user to interact with the electronic display device for commanding a page-up or page-down event using the user's one hand holding the electronic display device.

In this electronic display device, a control to be manipulated by the user for commanding page turns is located outside of the display screen. Many other electronic-book display devices, however, have a touch panel serving as the control, which is laid over the display screen in order to maximize the size of a display screen on which pages are displayed, within the limits of the overall size of each device. These other electronic-book display devices allow the user to perform a variety of inputs via finger touches of the touch screen for invoking reading or browsing.

Thus, many display devices are designed, for example, to allow a user to touch the finger to a touch panel laid over a display screen on which pages are displayed, to command page turns on the display screen. In addition, as disclosed in Patent Document No. 2, there is another type of image display device designed to turn pages in a manner that responds to motion of a user's finger in contact with and across a touch panel. This image display device disclosed in Patent Document No. 2 is further designed to allow the user to select the number of pages that are to be turned at a time on the display screen, by changing the number of ones of the user's fingers which touch the display screen altogether.

PRIOR-ART REFERENCES

Patent Documents

Patent Document No. 1: Japanese Patent Application Publication No. 2007-018095
Patent Document No. 2: Japanese Patent Application Publication No. 08-076926

SUMMARY OF THE INVENTION

Problem(s) that the Invention Attempts to Solve

As described above, many display devices are designed to invoke a page turn event on the display screen in response to a user's inputs via finger touches of the touch panel. These devices, however, are more prone to induce unintended events of page turns due to the user's incorrect inputs, than those designed to invoke a page turn in response to the user's alternative inputs via manipulation of a physical button or key.

In particular, when a display device is design to invoke a page turn in response to only a user's inputs via finger touches of the touch panel, even the user's inadvertent touches to the touch panel invoke unintended page-turn events. This limits the user's allowable range of inputs, as the user is required to, for example, keep the fingers away from the display screen while reading or browsing an electronic book, resulting in creation of a distraction when the user is trying to concentrate on reading or browsing. Also, in this scenario, the user is required to hold the display device with the user's hand, concurrently keeping all the fingers of the user's hand away from the display screen while reading or browsing an electronic book, and this makes it difficult for the user to hold the display device, in particular, when the user is reading or browsing the electronic book in supine position.

In addition, when a display device is designed to invoke a page turn in response to movement of a user's finger in contact with and across the display screen, unintended displacement of the user's finger while reading or browsing induces a page turn as well. In addition, if a threshold of a movement distance of the user's finger which is to be overcome to authorize a page turn is set to a greater value for avoiding unintended page turns, then the user is required to move the finger a longer distance, and it cannot be said that this movement qualifies as a gesture that the user can easily perform while reading or browsing.

Then, the object of the invention is to provide an electronic-book display device, a page-turning method and a program all of which are able to avoid unintended page turns due to a user's incorrect inputs, despite that a page turn is invoked in response to the user's gesture including an initial touch on a display screen (this gesture is categorized as a touch in a broad sense).

Means or Steps for Solving the Problem(s)

The following modes are provided by the invention. These modes will be stated below such that these modes are divided into sections and are numbered, such that these modes depend upon other mode(s), where appropriate, and such that each mode in such a dependent form permits each technical feature set forth in each mode to be independent or separate according to the nature of the corresponding technical feature, where appropriate.

(1) An electronic-book display device for successively displaying a plurality of pages of an electronic book by one or more pages each time on a display screen, and turning the pages on the display screen in response to a user's input via finger touch of the display screen, the electronic-book display device comprising:

a touch-position recognizing unit configured to determine whether a touch position at which a touch event is performed with the finger on the display screen has an overlap with one of predetermined at least one region on the display screen;

a page-turn-direction determining unit configured to be activated in response to an event occurring in which the touch position is determined to have an overlap with the predetermined at least one region, to determine a page turn direction in which the pages are to be turned on the display screen, based on information on a page turn direction assigned to the predetermined at least one region;

a pressing-force sensor detecting a pressing force with which the finger or the user's another finger presses the display screen;

a pressing-force recognizing unit configured to determine whether or not the detected pressing force is equal to or larger than a predetermined threshold; and an operation controller configured to be activated in response to an event occurring in which the detected pressing force is determined to be equal to or larger than the predetermined threshold, to authorize initiation of a page turn event for turning the pages on the display screen in the determined page-turn-direction.

(2) The electronic-book display device according to mode (1), further comprising a page-turn-speed determining unit configured to determine a page turn speed at which the pages are to be turned on the display screen, as a function of a magnitude of the detected pressing force, wherein the operation controller is configured to authorize initiation of a page turn event for turning the pages on the display screen at the determined page-turn-speed.

(3) The electronic-book display device according to mode (1), further comprising:

a touch-position-movement measuring unit configured to measure a distance of the finger touch position's movement that the user performs in succession to the touch event; and a page-turn-speed determining unit configured to determine a page turn speed at which the pages are to be turned on the display screen, as a function of the measured movement distance, wherein the operation controller is configured to authorize initiation of a page turn event for turning the pages on the display screen at the determined page-turn-speed.

(4) The electronic-book display device according to mode (1), further comprising:

a touch-position-movement measuring unit configured to measure a distance of the finger touch position's movement that the user performs in succession to the touch event; and a page-turn-speed determining unit configured to determine a page turn speed at which the pages are to be turned on the display screen, as a function of both the magnitude of the detected pressing force and the measured movement distance, wherein the operation controller is configured to authorize initiation of a page turn event for turning the pages on the display screen at the determined page-turn-speed.

(5) The electronic-book display device according to any one of modes (1)-(4), wherein the predetermined at least one region includes a first region assigned to an entire region or a local region of a right one of left and right halves of the display screen, and a second region assigned to an entire region or a local region of the left half of the display screen, the first and second regions are pre-assigned respective different page-turn-directions, and the page-turn-direction determining unit is configured to determine the page turn direction as a function of which one of the first and second regions the touch position has an overlap with.

(6) The electronic-book display device according to anyone of modes (1)-(4), wherein the predetermined at least one region includes a single region, the device further comprising a touch-position-movement measuring unit configured to measure a direction of the finger touch position's movement that the user performs in succession to the touch event, wherein the page-turn-direction determining unit is configured to be activated in response to an event occurring in which the touch position is determined to have an overlap with the predetermined region, and in which the detected pressing force is determined to be smaller than the predetermined threshold, to dynamically assign to the single region a page turn direction varying with the measured direction.

(7) The electronic-book display device according to mode (6), wherein an icon having a surface area is displayed on the display screen in the single region to visualize the single region, the icon contains a visual indication indicative of a page turn direction in which the pages are to be turned on the display screen, and the indication indicates a page turn direction assigned to the single region, and changes itself to reflect possible changes in the assigned page-turn-direction.

(8) The electronic-book display device according to any one of modes (1)-(4), further comprising a fold-line display controller configured to be activated in response to an event occurring in which the finger touch position has an overlap with a region that is located in the vicinity of a top corner of the displayed page on the display screen, and that is remote from the predetermined at least one region, and in which the detected pressing force is determined to be equal to or larger than the predetermined threshold or a predetermined second threshold, to cause a fold line to be displayed at the top corner of the displayed page.

(9) A method of turning pages in an electronic-book display device for successively displaying a plurality of pages of an electronic book by one or more pages each time on a display screen, and turning the pages on the display screen in response to a user's input via finger touch of the display screen, the method comprising:

a first step of determining whether a touch position at which a touch event is performed with the finger on the display screen has an overlap with one of predetermined in least one region on the display screen;

a second step, implemented in response to an event occurring in which the touch position is determined to have an overlap with the predetermined at least one region, of determining a page turn direction in which the pages are to be turned on the display screen, based on information on a page turn direction assigned to the predetermined at least one region;

a third step of detecting a pressing force with which the finger or the user's another finger presses the display screen;

a fourth step of determining whether or not the detected pressing force is equal to or larger than a predetermined threshold; and a fifth step, implemented in response to an event occurring in which the detected pressing force is determined to be equal to or larger than the predetermined threshold, of authorizing initiation of a page turn event for turning the pages on the display screen in the determined page-turn-direction.

(10) A method of successively displaying a plurality of pages of an electronic book by one or more pages each time on a display screen, and turning the pages on the display screen in response to a user's input via finger touch of the display screen, the method comprising:

upon the user's soft touch on the display screen with the finger with an intensity of touch below a predetermined value, selecting a page turn direction in which the pages are turned on the display screen, based on at least one of a position at which the soft touch was performed with the finger, and a direction of the finger's movement performed by the user in succession to the soft touch; and upon the selection being followed by the user's hard touch on the display screen with the finger with an intensity of touch above the predetermined value, authorizing initiation of a page turn event for turning the pages on the display screen in the selected page-turn-direction.

(11) The method according to mode (1), further comprising:

after the hard touch, determining a page turn speed at which the pages are turned on the display screen, based on at least one of the intensity of touch, and a distance over which the user has slid the finger across the display screen; and turning the pages on the display screen in the selected page-turn-speed.

(12) A program to be executed by a computer to perform the method according to any one of modes (9)-(11).

(13) A computer-readable non-transitory storage medium having stored therein the program according to mode (12).

Advantageous Effects of the Invention

An electronic-book display device, a page-turning method and a program according to the present invention allow a page turn to be invoked in response to the user's input including the user's motion with a greater intensity of touch than that of a pure touch (i.e., a touch in a narrow sense), which is to say, a hard touch, such as a finger press on a display screen. The hard touch (including the finger press) is such a type of motion that occurs less easily due to the user's inadvertent motion, than the user's other motions such as a pure touch with or a pure slide across the display screen. The invention therefore reduces the possibility that the user's incorrect inputs cause unintended page turns.

BRIEF DESCRIPTION OF THE DRAWINGS

FIG. 2(A) is a front view illustrating a mobile information device according to a second embodiment of the invention, and FIGS. 2(B) and 2(C) are schematic diagrams illustrating the relationship between forms of a user's finger gestures on a display screen of the mobile information device and forms of page turns.

FIG. 4(A) is a front view illustrating a mobile information device according to a fourth embodiment of the invention, and FIGS. 4(B) and 4(C) are schematic diagrams illustrating the relationship between forms of a user's finger gestures on a display screen of the mobile information device and forms of page turns.

MODES FOR CARRYING OUT THE INVENTION

Illustrative embodiments of the invention will be described in detail below with reference to the drawings.

First, as a general overview, electronic-book display devices according to embodiments of the invention have a display function for successively displaying a plurality of pages of an electronic book by one or more pages each time, and a touch panel function for, in response to a user's finger touch on the display screen, detecting the position of the finger touch, thereby enabling the user's inputs.

Those embodiments are featured in that a page turn on the display screen is invoked in response to the user's finger press on the display screen (i.e., an example of the user's input via touch of the display screen with an intensity of touch greater than that of a pure touch) in a pre-selected region, such as, a region in the vicinity of one of bottom corners of the displayed page. In addition, those embodiments allow the user to control a page turn speed by adjusting the magnitude of a pressing force with which the user presses the finger to the display screen, the distance by which the user has moved the finger in pressing contact with and across the display screen, or both.

It is noted that a touch panel is used for providing an electronic-book displaying function, and is also used for providing additional functions. Because of this, it is not rare that an electronic-book display device equipped with a touch panel, such as in the practice of the invention, is a mobile information device configured to provide an electronic-book display function and additional functions. With this in mind, mobile information devices incorporating an electronic-book display function (hereinafter, referred to as "mobile information devices") will be described below, as illustrative embodiments of the invention. What the invention can apply to, however, is not limited to devices of this type, but may be, for example, terminal equipment exclusively designed for displaying electronic books, such as an electronic-book reader.

General Overview of First Embodiment

FIG. 1 includes a front view illustrating a mobile information device 1 according to a first embodiment of the invention, and schematic diagrams illustrating the relationship between forms of a user's finger gestures and forms of page turns.

Figure 1A:
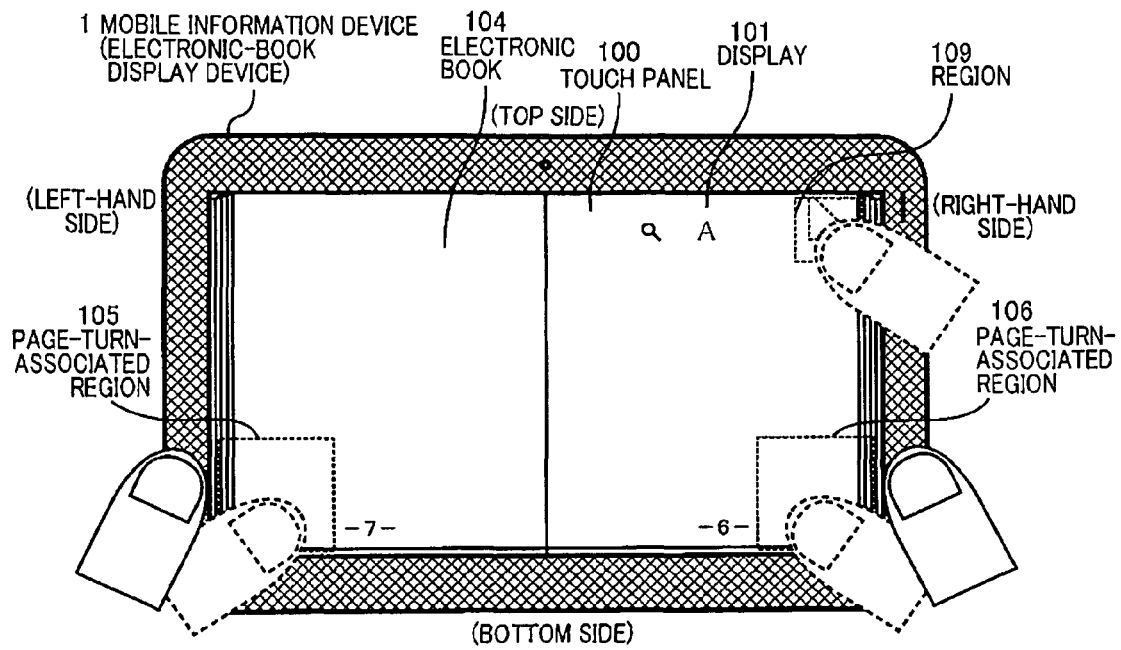
FIG. 1(A) is a front view illustrating a mobile information device according to a first embodiment of the invention.

FIG. 1(A) is a front view illustrating the mobile information device 1. As illustrated in this front view, one or more pages of an electronic book 104 are displayed on a display screen of a display 101 (a two-page spread view of Pages 6 and 7, in an example depicted in this figure). Further, page-turn-associated regions 105 and 106, which serve as a plurality of pre-selected regions, are laid over the display screen. Still further, a touch panel 100 is disposed on the display screen for successively delivering positions of the user's finger over time.

In the present embodiment, the page-turn-associated regions 105 and 106 are assigned to a region in the vicinity of a bottom-left corner of a one page's worth sub-image displayed in a left one of left and right halves of the display screen, and a region in the vicinity of a bottom-right corner of a one page's worth sub-image displayed in a right one of the left and right halves of the display screen, respectively. If the user in an attempt to invoke a page turn on the display screen presses the finger to a selected one of the page-turn-associated regions 105 and 106, then the page turn is initiated.

The page-turn-associated region 105 is pre-assigned one of both directions of turning the pages, which is for turning the pages forward (i.e., a direction that increases the page number). When the user attempts to invoke a page turn, if the finger touch position has an overlap with the page-turn-associated region 105, then a page up direction is selected as the direction for the subsequent page-turn event.

Figures 1B, 1C:
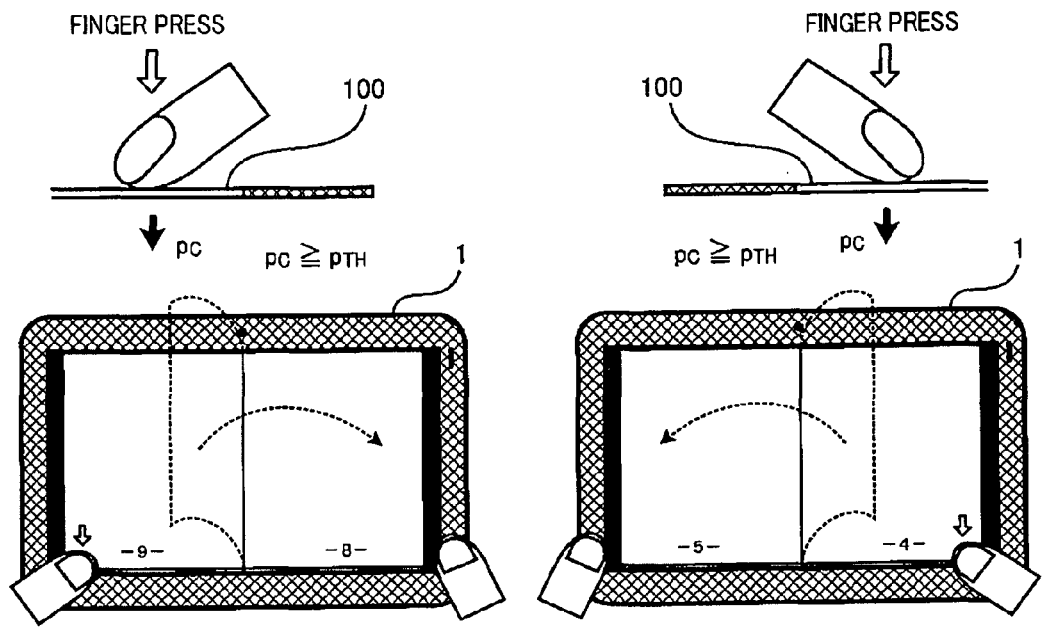
FIGS. 1(B) and 1(C) are schematic diagrams illustrating the relationship between forms of a user's finger gestures on a display screen of the mobile information device and forms of page turns.

More specifically, in an example depicted in FIG. 1(B), for invoking a page turn, the finger is pressed to the touch panel 100 such that the finger touch position has an overlap with the page-turn-associated region 105. At this moment, if the finger's pressing force $p_C$ satisfies the condition expressed with a formula: $Pc \geq p_{TH}$, with a predetermined threshold being denoted as $p_{TH}$, then a page up is invoked. In the example depicted in FIG. 1(B), Page 7 is turned forward and a two-page spread view of Pages 8 and 9 comes off on the display screen.

In this regard, the threshold $p_{TH}$ can be set to a value within a range, for example, from 0.5 N to 2.0 N. It is noted that the finger's pressing force $p_C$ is detected by a pressing-force detector 102 (see FIG. 5) as described below.

On the other hand, the page-turn-associated region 106 is pre-assigned one of both directions of turning the pages, which is for turning the pages backward (i.e., a direction that that increases the page number). When the user attempts to invoke a page turn, if the finger touch position has an overlap with the page-turn-associated region 106, then a page down direction is selected as the direction for the subsequent page turn.

More specifically, in an example depicted in FIG. 1(C), for invoking a page turn, the finger is pressed to the touch panel 100 such that the finger touch position has an overlap with the page-turn-associated region 106. At this moment, if the finger's pressing force $p_C$ satisfies the condition expressed with the formula: $p_c \geq p_{TH}$, then a page down is invoked. In the example depicted in FIG. 1(C), Page 6 is turned back and a two-page spread view of Pages 4 and 5 comes off on the display screen.

Further, in both scenarios of a page up (see FIG. 1(B)) and a page down (see FIG. 1(C)), a page turn speed $v_P$ with which the pages turn on the display screen is determined as a function of the magnitude of the pressing force $p_C$. For example, the more strongly the finger is pressed against the display screen, the more pages are turned per second. How to determine the page turn speed $v_P$ will be elaborated below with reference to FIG. 3(A).

In any case, the page turn speed $v_P$ is determined as a function of the magnitude of the pressing force $p_C$, meaning that a page turn can be performed without requiring the user to move the finger in contact with and across the display screen.

In other words, in the present embodiment, a series of motions required for the user to turn the pages include a pure touch on a user-selected one of the page-turn-associated regions 105 and 106 on the display screen, which reflects the direction in which the user desires to turn the pages (i.e., the start of the user's request for a page turn, and the user's setting of a page turn direction), a press on the display screen at the same position as the initial position (i.e., the user's authorization of start of a page turn), and a subsequent press on the display screen at the same position as the initial position, with a greater force (i.e., the user's initial setting and subsequent adjustment of a page turn speed).

In addition, in the present embodiment, as illustrated in FIG. 1(A), if the user presses the finger to the display screen in a region 109 in the vicinity of a top corner of a page displayed on the right half of the display screen (a top-right corner in the example depicted in FIG. 1(A)), then a fold line is added to the displayed page. The region 109 is remote from the page-turn-associated regions 105 and 106 to which respective page-turn-directions are assigned, and, even if the finger is pressed against the region 109, a page turn does not start.

More specifically, if the finger touch position has an overlap with the region 109, and the finger pressing force $p_C$ is equal to or greater than the threshold $p_{TH}$, then a fold line is displayed at a top corner of a page displayed on the right half of the display screen (the top-right corner, in the example depicted in FIG. 1(A)). It is noted that a threshold of the pressing force $p_C$ to be overcome for authorizing display of the fold line may have a different magnitude from that of the threshold $p_{TH}$.

General Overview of Second Embodiment

FIG. 2 includes a front view illustrating a mobile information device 1 according to a second embodiment of the invention, and schematic diagrams illustrating the relationship between forms of a user's finger gestures and forms of page turns.

FIG. 2(A) is a front view illustrating the mobile information device 1. As illustrated in this front view, like in FIG. 1(A), one or more pages of an electronic book 104 (in an example depicted in FIG. 2(A), a two-page spread view of Pages 8 and 9 is displayed, but, in this figure, Page 8 is visible, while Page 9 is invisible because the illustration is omitted). Further, a page-turn-associated region 107, which serves as a first predetermined region, and a second page-turn-associated region (not shown), which serves as a second predetermined region are laid over the display screen. Still further, the touch panel 100 is disposed on the display screen.

The page-turn-associated region 107 is assigned to a region in the vicinity of a bottom-right corner of a one page's worth sub-image displayed in the right half of the display screen. It is noted that, although not shown, the second page-turn-associated region is assigned to a region in the vicinity of a bottom-left corner of a one page's worth sub-image displayed in the left half of the display screen. If the user in an attempt to invoke a page turn on the display screen presses the finger to the page-turn-associated region 107, and subsequently moves (slides) the finger in pressing contact with and across the display screen, then a page turn is enabled.

The page-turn-associated region 105 is pre-assigned one of both directions of turning pages, which is for turning the pages backward (i.e., a direction that decreases the page number). When the user attempts to invoke a page turn, if the finger touch position has an overlap with the page-turn-associated region 107, then a page down direction is selected as the direction for the subsequent page turn event.

More specifically, in an example depicted in FIG. 2(B), the finger is pressed to the touch panel 100 such that the finger touch position has an overlap with the page-turn-associated region 107, and the finger is slid (moved) across and in pressing contact with the display screen. At this moment, if the finger's pressing force $p_C$ is equal to or greater than the predetermined threshold $p_{TH}$ (i.e., $P_c \geq p_{TH}$), then a page down is initiated. In the example depicted in FIG. 2(C), Pages 8, 6 and 4 are turned back and a two-page spread view of Pages 2 and 3 comes off on the display screen. In FIG. 2(C), however, Page 3 is invisible which is supposed to be displayed on the left half of the display screen.

On the other hand, although not shown, the above-described second page-turn-associated region is pre-assigned one of both directions of turning pages, which is for turning the pages forward (i.e., a direction that increases the page number). When the user attempts to invoke a page turn, if the finger touch position has an overlap with this page-turn-associated region, then a page up direction is selected as the direction for the subsequent page turn. Similarly with a scenario where the user touches the finger to the above-described page-turn-associated region 107, a finger press in a manner that allows the finger touch position to overlap with this second page-turn-associated region and a subsequent finger movement invoke a page up.

Further, in both scenarios of a page up and a page down, the page turn speed $v_P$ on the display screen is determined as a function of the distance $d_C$ by which the finger has moved across the display screen (i.e., a sliding distance). For example, the longer the finger has displaced (the longer the movement distance $d_C$ is), the more pages are turned per second. How to determine the page turn speed $v_P$ will be elaborated below with reference to FIG. 3(B).

In addition, an origin that is referenced for measuring the finger movement distance $d_C$ (i.e., a reference point for measurement) is selected to be equal to the finger touch position taken when the finger pressing force $p_C$ has become equal to or greater than the threshold $p_{TH}$. Although this movement distance $d_C$ may be used to serve as the finger's movement distance that is referenced for determining the page turn speed $v_P$ (i.e., an effective movement distance), a component of the finger's movement distance which is measured along an X-axis direction (i.e., a direction in which a bottom one of four sides of an electronic book displayed on the display screen (i.e., a direction in which pages are turned)) may be used to serve as the finger's movement distance that is referenced for determining the page turn speed $v_P$ (i.e., an effective movement distance). In this case, the user actually turns the pages of the electronic book 1004, but figuratively turns pages of a physical book by sliding the finger along one of edges of the physical book.

It is noted that, whether the first embodiment depicted in FIG. 1 as described above or the second embodiment depicted in FIG. 2, it may be practiced such that the user locates the left-hand's finger and the right-hand's finger together at the first and second page-turn-associated regions 105, 106 and 107, respectively, while reading or browsing the electronic book 104. Unless the user presses one of those fingers more strongly than the other, a page turn is not invoked, meaning that the user's incorrect inputs would not cause any unintended page turns.

In this case, the mobile information device 1 may be designed to determine the direction of turning pages to be equal to one of the first and second page-turn-associated regions 105, 106 and 107, which has been first touched by any one of the user's fingers. In that case, it is preferable that a directional representation, such as an arrow indicative of the determined direction of turning pages is displayed on the display screen of the display 101. In an example, if the representation indicates a leftward direction, then the page turn direction is assigned a page up direction, while, if the representation indicates a rightward direction, then the page turn direction is assigned a page down direction.

This allows the user to authorize initiation of a desired form of a page turn after identifying which direction is the determined direction of turning pages by viewing the representation, even if the user cannot remember which one of the first and second page-turn-associated regions the user first located the finger, because, at some time, the user's fingers are located in the first and second page-turn-associated regions, respectively.

In addition, whether the first embodiment depicted in FIG. 1 or the second embodiment depicted in FIG. 2, it may be practiced such that those two page-turn-associated regions 105, 106 and 107 are assigned to the entire right half and the entire left half of the display screen, respectively. In this case, the user in an attempt to turning the pages is enough to press the finger against a desirable one of the right half and the left half of the display screen, at any position. Moreover, it is preferable that the first and second page-turn-associated regions 105, 106 and 107 are invisible to the user for avoiding creation of a visual obstruction to the user's reading or browsing of an electronic book, but the first and second page-turn-associated regions 105, 106 and 107 may be displayed on the display screen within a region that would not create any visual obstruction, allowing the user to visually perceive the first and second page-turn-associated regions 105, 106 and 107.

In addition, whether for use in the first embodiment depicted in FIG. 1 or for use in the second embodiment depicted in FIG. 2, the electronic book is displayed as if it were bound on the right side (written vertically), but it is of course that the electronic book may be displayed as if it were bound on the left side (written horizontally, typically). When the electronic book is bound on the left side, it is preferable that the left half of the display screen is entirely or locally assigned a page down direction (i.e., a direction that decreases the page number), and the right half of the display screen is entirely or locally assigned a page up direction (i.e., a direction that increases the page number). Further, the electronic book may be displayed in a one-page-by-one-page format or any other format, instead of a spread format (on a per-consecutive-two-page basis). Moreover, the mobile information device 1 may have a size that allows the user to hold it with one hand, or a size that requires the user to hold it with both hands.

As will be evident from the foregoing, the first embodiment depicted in FIG. 1 and the second embodiment depicted in FIG. 2 allow the user to invoke a page turn by selecting one of the page-turn-associated regions on the display screen (within the frame of the display screen) and pressing the finger against the selected page-turn-associated region. This reduces the possibility that the user's incorrect inputs cause unintended page turns, despite that a page turn is invoked in response to the user's series of motions via touches of the display screen (i.e., a series of motions each of which is categorized as a touch in a broad sense).

It is noted that there is a conventional page-turn technique in which a slide bar is disposed on a display screen and, in response to a user's drag of the slide bar with the user's finger, the pages are fast-forwarded to a target page having a position identified as a function of the length of a distance by which the slide bar has been dragged by the user. This would require the user to move the finger up to where the slide bar is being displayed. This would increase the required length of the finger's movement, possibly requiring the user to hold the entire display device again with the user's another hand. In contrast, whether the first embodiment depicted in FIG. 1 or the second embodiment depicted in FIG. 2, it allows the user to issue a request for starting a page turn at a desire value of the page turn speed $v_P$, without any movement of the finger touch point, or with only the finger's movement within the user's effortless reach. Further, the user in an attempt to turn the pages is not required to hold the entire display device again with the user's another hand.

FIG. 3 illustrates graphs for explanation of how each of the mobile information device 1 according to the first embodiment depicted in FIG. 1, the mobile information device 1 according to the second embodiment depicted in FIG. 2, and a mobile information device 1 according to a third embodiment of the invention determines the page turn speed $v_P$.

Speed Determination Methods in First Embodiment

Figure 3A:
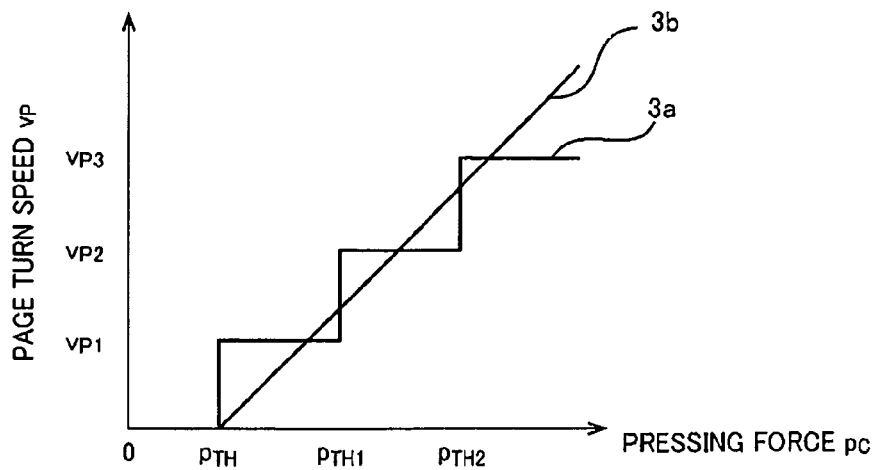
FIG. 3(A) is a graph showing how the mobile information device according to the first embodiment depicted in FIG. 1 determines a page turn speed $v_P$.

In FIG. 3(A), two different relationships 3a and 3b between the finger pressing force $p_C$ and the page turn speed $v_P$ in the first embodiment that was described with reference to FIG. 1 are graphed. In the first embodiment depicted in FIG. 1, the page turn speed $v_P$ is determined as a function of the magnitude of the pressing force $P_C$.

According to the relationship 3a, the page turn speed $v_P$ is set to zero within a range of the pressing forces $p_C$ below the threshold $p_{TH}$. The page turn speed $v_P$ is set to $V_{AD1}$ within a range of the pressing forces $p_C$ satisfying $p_{TH} \leq p_C < p_{TH1}$, to $v_{P2}$ ($>v_{P1}$) within a range of the pressing forces $p_C$ satisfying $p_{TH1} \leq p_C < p_{TH2}$, and to $V_{P3}$ ($>v_{P2}$) within a range of the pressing forces $p_C$ satisfying $P_{TH2} \leq p_C$. In this case, the page turn speed $v_P$ increases in steps, as the finger press becomes stronger.

In addition, according to the relationship 3b, the page turn speed $v_P$ is directly proportional to the pressing force $p_C$, and so is set to a value continuously increasing as the pressing force $p_C$ increases. In this case, the page turn speed $v_P$ increases proportionally to the value of ($p_C - p_{TH}$), as the pressing force $p_C$ increases.

In this regard, whether the relationship 3a or 3b, it has the threshold $p_{TH}$ associated with the pressing force $p_C$. This allows the user to issue a page turn request only by conducting a predetermined positive motion, that is, a finger press (this motion must be followed by the user's definite decision, and so hardly occurs just from the user's inadvertence). In other words, the user is not allowed to issue a page turn request only by purely touching the finger to the display screen. As a result, the user's incorrect inputs would not cause any unintended page turns.

In addition, the pages may be successively turned by one or more pages each time. In a case where the page turn speed $v_P$ is equal to 4 page/second, one page may be turned each time per 1.25 seconds, or two pages may be turned each time per 0.5 seconds. In addition, while the finger is being increasingly pressed against the display screen, the pages are successively turned with the page turn speed $v_P$ varying with the pressing force $p_C$, as the pressing force $p_C$ grows larger. It is noted that, in order to stop a page turn, the user is required to loosen a finger press to reduce the pressing force $p_C$ to a value below the threshold $p_{TH}$, or releases the finger from the touch panel 100.

Speed Determination Methods in Second Embodiment

Figure 3B:
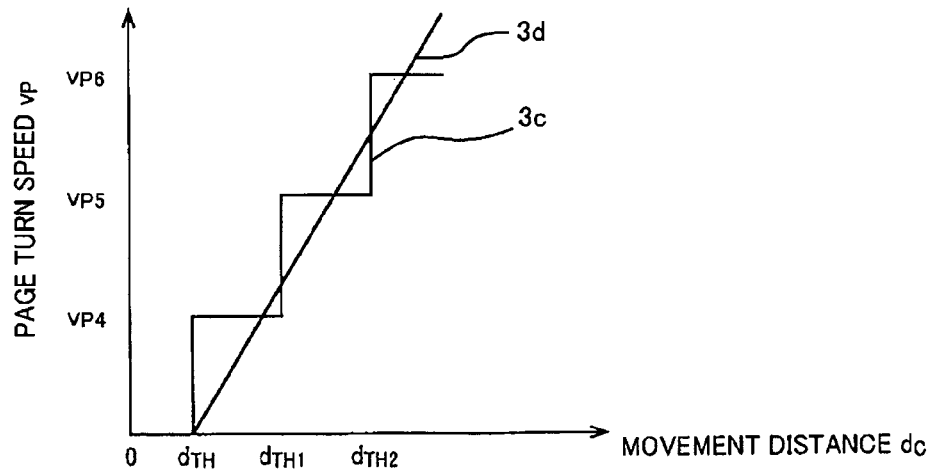
FIG. 3(B) is a graph showing how the mobile information device according to the second embodiment depicted in FIG. 2 determines a page turn speed $v_P$.

In FIG. 3(B), two different relationships 3c and 3d between the finger movement distance $d_C$ and the page turn speed $v_P$ in the second embodiment that was described with reference to FIG. 2 are graphed. In the second embodiment depicted in FIG. 2, the page turn speed $v_P$ is determined as a function of the finger movement distance $d_C$.

According to the relationship 3c, the page turn speed $v_P$ is set to zero within a range of the finger movement distances $d_C$ below a threshold $d_{TH}$. The page turn speed $v_P$ is set to $v_{P4}$ within a range of the finger movement distances $d_C$ satisfying $d_{TH} \leq d_C < d_{TH1}$, to $v_{P5}$ ($>v_{P4}$) within a range of the movement distances $d_C$ satisfying $d_{TH1} \leq d_C < d_{TH2}$, and to $v_{P6}$ ($>v_{P5}$) within a range of the movement distances $d_C$ satisfying $d_{TH2} \leq d_C$. In this case, the page turn speed $v_P$ increases in steps, as the movement distance $d_C$ increases with the finger kept pressed.

In addition, according to the relationship 3d, the page turn speed $v_P$ is directly proportional to the movement distance $d_C$, and so is set to a value continuously increasing as the movement distance $d_C$ increases. In this case, the page turn speed $v_P$ increases proportionally to the value of ($d_C - d_{TH}$), as the finger movement distance increases.

In this regard, whether the relationship 3c or 3d, it has the threshold $d_{TH}$ associated with the movement distance $d_C$. This prevents the user's unintended slight displacement of the finger on the display screen from causing a page turn. As a result, the user's incorrect inputs would not cause any unintended page turns.

In other words, in the present embodiment, as opposed to the first embodiment, the user's finger press against the display screen does not directly invoke a page turn, but the user's finger press in succession, combined with the user's concurrent finger movement over a distance equal to or longer than a predetermined value, invokes a page turn.

In addition, in the present embodiment, similarly with the first embodiment, the conditions to be met for authorization of a page turn event include $p_C \geq p_{TH}$ (see FIG. 2(B)). This prevents the user's unintended motion including a light touch on the display screen and the subsequent finger movement from invoking any page turns. As a result, the user's incorrect inputs would not cause any unintended page turns.

In addition, the pages may be successively turned by two pages or one page each time. In a case where the page turn speed $v_P$ is equal to 8 page/second, four pages may be turned each time per 0.5 seconds, or one page may be turned each time per 0.125 seconds. In addition, after the user has moved the finger over a particular distance while pressing the finger against the display screen, as long as the finger is stationarily held pressed, the pages are successively turned at the page turn speed $v_P$ varying with the movement distance $d_C$. It is noted that the user who needs to stop the page turn moves the finger back to the initial position (i.e., a start position of the finger movement) (i.e., the movement distance $d_C$=0), loosens the finger press to reduce the pressing force $p_C$ to a value below the threshold $p_{TH}$, or releases the finger from the touch panel 100.

Speed Determination Methods in Third Embodiment

Figure 3C:
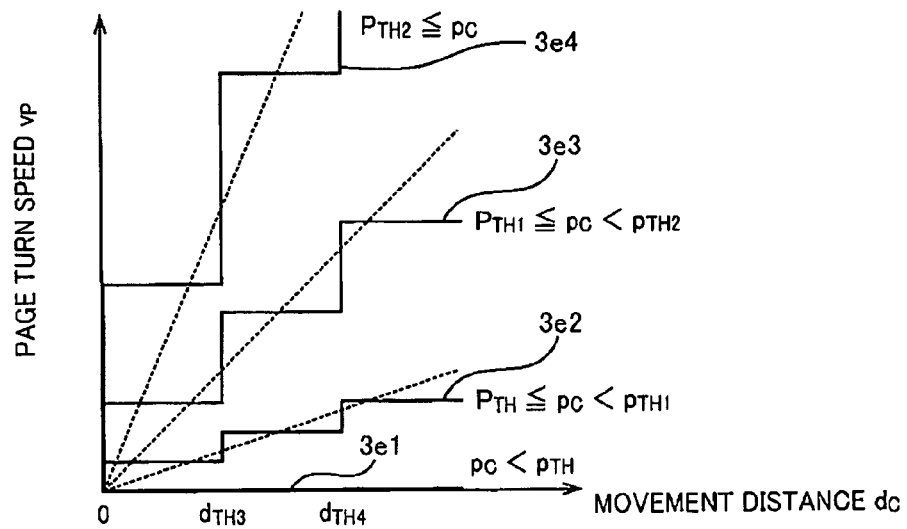
FIG. 3(C) is a graph showing how a mobile information device according to a third embodiment of the invention determines a page turn speed $v_P$.

FIG. 3(C) illustrates the relationships between the finger pressing force $p_C$ and the page turn speed $v_P$ and the relationships between the movement distance $d_C$ and the page turn speed $v_P$ in the third embodiment. In this embodiment, in contrast to the second embodiment depicted in FIG. 2 (the page turn speed $v_P$ is dependent on the finger movement distance $d_C$), the page turn speed $v_P$ is determined as a function of both the finger pressing force $p_C$ and the finger movement distance $d_C$.

As illustrated in FIG. 3(C), according to a relationship 3e1, the page turn speed $v_P$ is set to zero within a range of the pressing forces $p_C$ below the threshold $p_{TH}$. The page turn speed $v_P$ is a function of the finger movement distance $d_C$, which is defined according to a relationship 3e2, within a range of the pressing forces $p_C$ satisfying $p_{TH} \leq p_C < p_{TH1}$. The page turn speed $v_P$ is a function of the finger movement distance $d_C$, which is defined according to a relationship 3e3, within a range of the pressing forces $p_C$ satisfying $p_{TH1} \leq p_C < p_{TH2}$. The page turn speed $v_P$ is a function of the finger movement distance $d_C$, which is defined according to a relationship 3e4, within a range of the pressing forces $p_C$ satisfying $p_{TH2} \leq p_C$. It is noted that the relationships 3e2 through 3e4 are each indicated using a stepped graph, but this may be replaced with a straight line graph as illustrated with the dotted line, or a curved graph.

In this regard, the pages may be successively turned by one or more pages each time. It is also preferable that the pages may be successively turned by one page each time within a range of the movement distances dc satisfying $0 < d_C < d_{TH3}$, by two pages each time within a range of the movement distances dc satisfying $d_{TH3} \leq d_C < d_{TH4}$, and by three pages each time within a range of the movement distances dc satisfying $d_{TH4} \leq d_C$. In this implementation, the user starts with a finger press against the display screen with a selected value of the pressing force $p_C$, which generates a value of the page turn speed $v_P$ expressed with, for example, $v_P$=4 page/second to reflect the current value of the pressing force $p_C$ (with the movement distance $d_C$=0). This leads to a page turn event in which one page is turned each time per 0.25 seconds. The user continues to move the finger by a value of the movement distance $d_C$ without changing the pressing force $p_C$, which generates a value of the page turn speed $v_P$ expressed with, for example, $v_P$=8 page/second to reflect the values of the pressing force $p_C$ and movement distance $d_C$ (e.g., $d_{TH3} \leq d_C < d_{TH4}$). This leads to a page turn event in which two pages are turned each time at intervals of 0.25 seconds whose length is kept unchanged.

As will be evident from the foregoing, the embodiments described above allow the user to adjust the page turn speed $v_P$ by changing the magnitude of the finger's pressing force $p_C$, the movement distance $d_C$ of the finger's touch position from the position at which the finger was located when the finger started being presses, or both. This helps the user to turn a desired number of pages accurately and quickly, even with the finger used for manipulation being held in contact with the display screen (without releasing the finger that is in contact with the display screen, from the display screen).

General Overview of Fourth Embodiment

FIG. 4 contains a front view illustrating a mobile information device 1 according to a fourth embodiment of the invention, and schematic diagrams illustrating the relationship between forms of a user's finger gestures and forms of page turns.

FIG. 4(A) is a front view illustrating the mobile information device 1. As illustrated in this front view, the mobile information device 1 is held by the user with the user's one hand. In addition, the pages of the electronic book 104 are successively displayed by one page each time on the display screen of the display 101 (in this figure, Page 8), and a page turn icon 108 is also displayed. The touch panel 100 is disposed on the display screen.

In this embodiment, a page turn direction varying with the user's input to the display screen is dynamically assigned to the page-turn icon (i.e., a predetermined single region). The page-turn icon 108 has a surface area, and the entire area serves as a predetermined region which is to be assigned a page turn direction.

The page turn icon 108 is preferably located on the display screen within a reach of a finger of the user's one hand with which the user holds the mobile information device 1. In an example depicted in FIG. 4(A), the page turn icon 108 is located in the vicinity of a bottom-right corner of the page being displayed. As will be described below, this allows the user to make gestures for invoking a page turn, using a finger of one hand with which the user holds the mobile information device 1. It is noted that the page turn icon 108 may be replaced with an alternative region such as the page-turn-associated region 106 depicted in FIG. 1(A). In that case, the alternative region is preferably displayed on the display screen in a manner that does not create any visual obstruction within the user's view when reading or browsing.

In the process of assigning a page turn direction, the user starts with a finger touch on the page turn icon 108 (to overlap with a region of the display screen where the page turn icon 108 is being displayed). At this moment, the pressing force $p_C$ takes a value below the threshold $p_{TH}$ (when $p_C < p_{TH}$), and does not satisfy the condition to be met for authorization of start of a page turn ($p_C \geq p_{TH}$). As illustrated in FIG. 4(B), the user continues to move (slide) the finger still in contact with the touch panel 100.

If the finger movement at that moment is considered as a leftward direction, then the page turn icon 106 (its region where the page turn icon 108 is being displayed) is assigned a page up direction (i.e., a direction that increases the page number). In contrast, if the finger movement at that moment is considered as a rightward direction, then the page turn icon 106 (its region where the page turn icon 108 is being displayed) is assigned a page down direction (i.e., a direction that decreases the page number). In this regard, the page turn icon 108 has preferably a visual indication indicative of the assigned page-turn-direction (an indication that directly or intuitively indicates a particular direction (e.g., a triangle, an arrow, a figure, etc.), an indication that perceptually or suggestively indicates a particular direction (e.g., a symbol, a character or character set, etc.)) (in an example depicted in FIG. 4(A), the page turn icon 108 is displayed in the form of a triangle). This arrangement allows the user to visually identify the page turn direction currently assigned to the page turn icon 108 (a predetermined single region) only by the user's glance at the page turn icon 108.

Thereafter, for invoking a page turn, as illustrated in FIG. 4(C), the user presses the finger against the display screen at the page turn icon 108 that has been assigned a particular direction, with a pressing force $p_C$ equal to or larger than the threshold $p_{TH}$ ($p_C \geq p_{TH}$). This invokes a page turn in which the pages are successively turned in the currently-assigned direction (in the example depicted in FIG. 4(C), the pages are successively turned backward, and eventually Page 7 comes up). In this regard, similarly with the first embodiment that was described with reference to FIG. 3(A), the page turn speed $v_P$ is determined as a function of the magnitude of the pressing force $p_C$. During a finger press against the page turn icon 108, the pages are kept being, successively turned at the page turn speed $v_P$.

In other words, in the present embodiment, a series of motions required for the user to invoke a page turn are formed with a pure finger touch on the display screen at a pre-selected single position (i.e., the initiation of a page turn request), a finger movement in a direction reflecting a desired page-turn-direction, with the finger in contact with the display screen (i.e., the setting of a page turn direction), a finger stop on the display screen at a position and a subsequent finger press on the display screen at the stop position (i.e., the authorization of start of a page turn), and a subsequent another finger press on the display screen at the same position (i.e., the initial setting and the subsequent adjustment of a page turn speed).

In a variant, it is preferable that the user invokes a page turn by a combined motion of a finger press on the display screen at the page turn icon 108 and a finger movement across the display screen. In this case, the page turn speed $v_P$ may be determined as a function of the finger's movement distance $d_C$, as in the second embodiment that was described with reference to FIG. 3(B), or may be determined as a function of both the magnitude of the pressing force $p_C$ and the finger's movement distance $d_C$, as in the third embodiment that was described with reference to FIG. 3(C).

As described above, the fourth embodiment depicted in FIG. 4 allows the user to issue a page turn request by selecting a page turn direction using only a finger of the user's one hand holding the mobile information device 1.

<Hardware Configuration>

Figure 5:
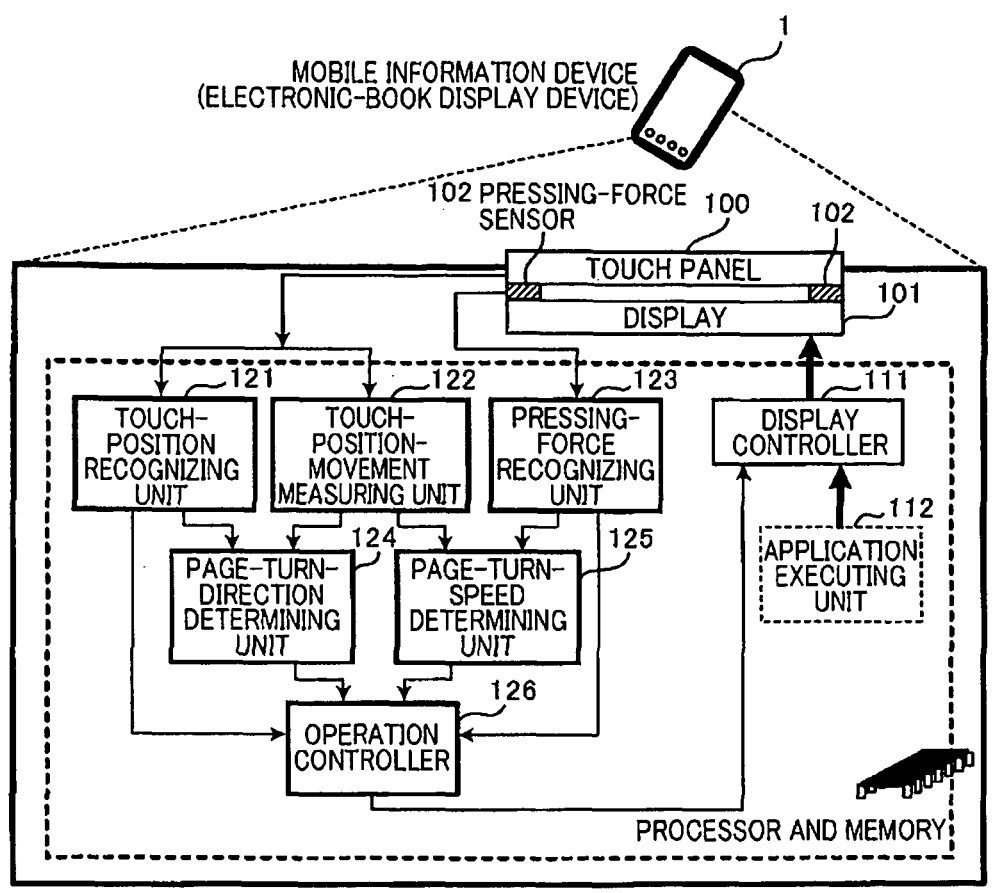
FIG. 5 is a functional block diagram conceptually illustrating the common configuration of the mobile information devices according to the first through fourth embodiments.

FIG. 5 is a functional block diagram conceptually illustrating the common configuration of the mobile information devices 1 according to the first through fourth embodiments.

As illustrated in FIG. 5, the mobile information device 1 includes the touch panel 100, the display 101, pressing-force sensors 102, and a processor and memory.

The processor and memory incorporates a touch-position recognizing unit 121, a touch-position-movement measuring unit 122, a pressing-force recognizing unit 123, a page-turn-direction determining unit 124, a page-turn-speed determining unit 125, an operation controller 126, a display controller 111, and an application executing unit 112. The processor and memory executes a plurality of programs including a page-turn control program as described below to provide their functions.

As well known, the processor and the memory together constitute a computer. The memory has previously stored therein the page-turn control program for performing the page-turning method as outlined above. The memory is an example of a computer-readable and non-transitory storage medium having stored therein the page-turn control program.

The display 101 displays images representative of pages of the electronic book 104. In the present embodiment, the touch panel 100 is laid over the display screen of the display 101, and senses and outputs successive locations of the user's finger touch points on the display screen over time. The touch panel 100 may be in the form of a projected capacitive touch panel, a surface capacitive touch panel, a resistive touch panel, an ultra-sonic surface acoustic wave touch panel, an infra-red touch panel, or the like.

As described above, the touch panel 100 is laid over the display screen of the display 101, and so, to be exact, the user cannot touch the display screen of the display 101 with the finger, and what the user can touch is an exposed surface or a touch screen of the touch panel 100. Substantially, however, the user perceives as if an image were displayed on the touch screen of the touch panel 100, and so, the touch screen of the touch panel 100 is equivalent to the display screen of the display 101. For the sake of explanation, therefore, throughout the specification, the surface of a control section of the mobile information device 1 is referred to as a display screen, irrespective of which component of the mobile information device 1 forms the surface.

Like in the present embodiment, when the display 101 and the touch panel 100 are constructed in a so-called dual layer type in which a display function and a touch panel function are provided by separate devices, the display screen of the display 101 and the touch screen of the touch panel 100 are separate from each other, with the touch screen being laid over the display screen, and alternatively, when the display 101 and the touch panel 100 are constructed in a so-called single layer type in which a display function and a touch panel function are provided by a single device, the display screen of the display 101 and the touch screen of the touch panel 100 are the same component.

The pressing-force sensors 102 detect a pressing force $p_C$ with which the user presses the finger against the touch panel 100 (each of the page-turn-associated regions 105, 106 and 107 and the page turn icon 108). In an example, each pressing-force sensor 102 is disposed behind the touch panel 100 (e.g., between the back face of the touch panel 100 and the front face of the display 101) at each of four corners of the touch panel 100 (or a greater number of corners or a smaller number of corners that are remote from each other), and the pressing force $p_C$ is measured by totaling four component forces with which the pressing-force sensors 102 are pressed at the four corners, respectively, by slight deflection created in the touch panel 100 with the pressing finger (each component force is detected by each pressing-force sensor 102). In an example, the pressing-force sensor 102 may be in the form of a piezoelectric sensor formed with piezoelectric materials such as PZT (lead zirconate titanate).

The pressing force $p_C$ is an example of a physical quantity expressing the intensity of the user's finger touch on the touch screen. The intensity of a finger touch can be expressed by at least one of the pressing force $p_C$, the size of an area in which the finger touches the touch screen, a change in electrical property in response to a finger touch on the touch screen, and a change in temperature in response to a finger touch on the touch screen. Therefore, in some other embodiments, the pressing force $p_C$ may be replaced with an alternative physical quantity that is categorized as the intensity of a finger touch, to provide the same function.

The touch-position recognizing unit 121 inputs finger-touch-position signals indicative of finger touch positions from the touch panel 100, and determines whether or not the finger touch position has an overlap with one of the predetermined regions within the display screen. In an example, according to the first embodiment depicted in FIG. 1, the touch-position recognizing unit 121 starts with making a determination as to whether or not the finger touch position has an overlap with the page-turn-associated region 105, continues to determine whether or not the finger touch position has an overlap with the page-turn-associated region 106, and, if the finger touch position has an overlap with one of the page-turn-associated regions 105 and 106, then the touch-position recognizing unit 121 determines that the user has issued a page turn request. Further, the touch-position recognizing unit 121 outputs the determination and information on a region overlapping with the finger touch position to the page-turn-direction determining unit 124.

The touch-position-movement measuring unit 122 inputs the finger touch position signals from the touch panel 100, measures a direction in which the finger touch position has moved, based on the finger touch position signals, and outputs the measurements to the page-turn-direction determining unit 124. Further, the touch-position-movement measuring unit 122 measures the movement distance dc of the finger touch position, and outputs the measurements to the page-turn-speed determining unit 125.

The pressing-force recognizing unit 123 inputs pressing-force signals from the pressing-force sensors 102, and outputs the magnitude of the detected pressing-force $p_C$ to the page-turn-speed determining unit 125. Further, the pressing-force recognizing unit 123 makes a determination as to which one of the finger's pressing force $p_C$ and the predetermined threshold $p_{TH}$ is larger, and outputs the determination to the operation controller 126.

The page-turn-direction determining unit 124 determines a page turn direction based on the determination that has been inputted from the touch-position recognizing unit 121. Further, the page-turn-direction determining unit 124 assigns the page turn direction to the predetermined region overlapping with the finger touch position, based on the measurements that have been inputted from the touch-position-movement measuring unit 122. Still further, the page-turn-direction determining unit 124 outputs those results to the operation controller 126.

The page-turn-speed determining unit 125 determines a page turn speed $v_P$ based on the measurements that have been inputted from the pressing-force recognizing unit 123 and/or the touch-position-movement measuring unit 122. Further, the page-turn-speed determining unit 125 outputs those results to the operation controller 126.

The operation controller 126 inputs the associated information from the page-turn-direction determining unit 124 and the page-turn-speed determining unit 125, and also inputs the determination from the pressing-force recognizing unit 123. Following that, the operation controller 126 commands the display controller 111 to invoke a page turn in the determined page turn direction at the determined page turn speed $v_P$.

Further, the operation controller 126 commands the display controller 111 to assign the determined page turn direction to the page turn icon 108 (the predetermined region) overlapping with the finger touch position. Still further, the operation controller 126 inputs the associated information from the touch-position recognizing unit 121 and the pressing-force recognizing unit 123. Thereafter, the operation controller 126 commands the display controller 111 to add a fold line to the top corner of the current page on the display screen, based on the associated information.

The display controller 111 inputs sets of information associated with whether to authorize initiation of a page turn event and whether to authorize initiation of a fold-line display event, from the operation controller 126, and commands the display 101 to display an image of the electronic book 104 in a manner that responds to the user instructions. Further, the display controller 111 commands the display 101 to display the page turn icon 108 (the predetermined region) which the current page-turn-direction has been assigned. Still further, the display controller 111 inputs application execution information (for reading or browsing electronic books, etc.) from the application executing unit 112, and commands the display 101 to display on the display screen an image associated with the application being executed.

<Page-Turning Methods and Page-Turn Control Programs>

FIGS. 6 to 9 are flowcharts conceptually illustrating the page-turning methods according to the first through fourth embodiments, respectively. With reference to these flowcharts, these page-turning methods will be described below. These page-turning methods are implemented by causing the processor and memory to execute the page-turn control programs, and so the explanation about these page-turning methods serves also as the explanation about the page-turn control programs.

<Page-Turning Method in First Embodiment>

Figure 6:
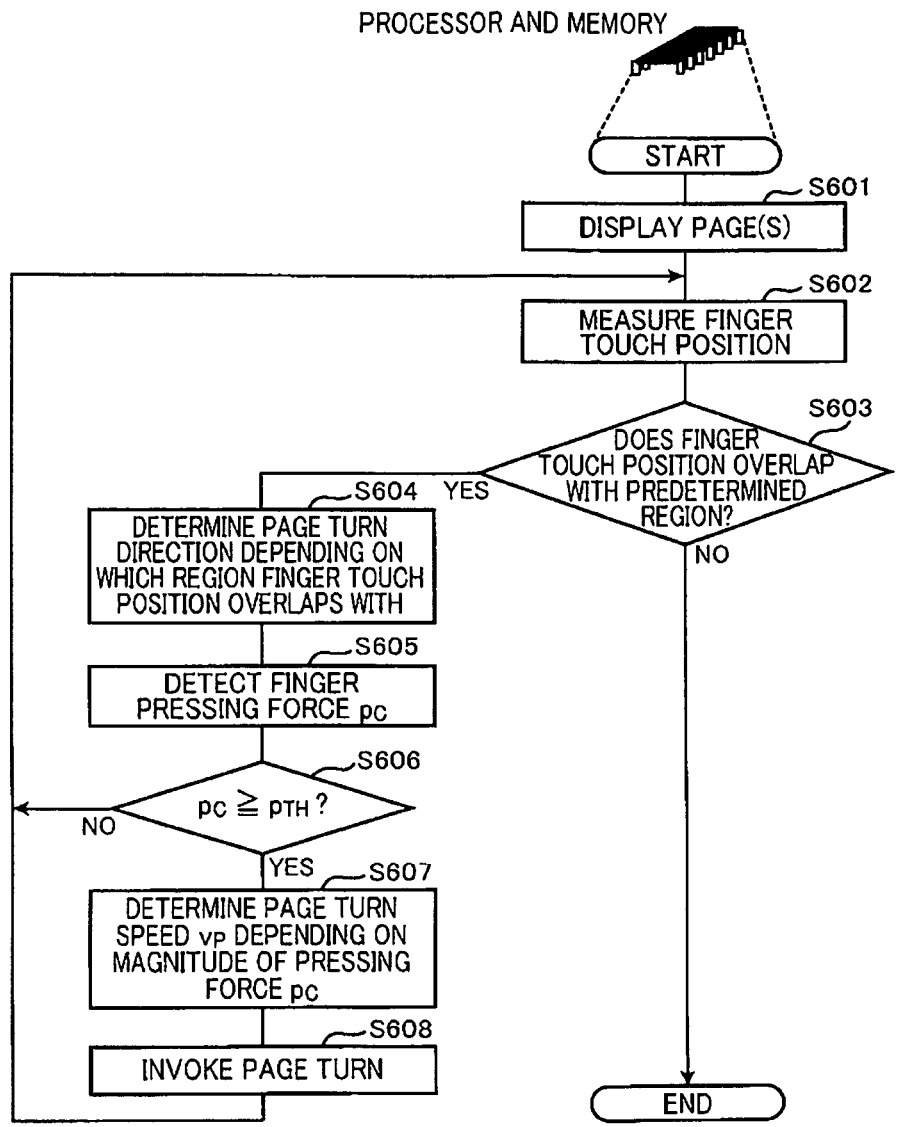
FIG. 6 is a flowchart conceptually illustrating a page-turn control program executed by a processor of the mobile information device according to the first embodiment.

FIG. 6 is a flowchart illustrating the page-turning method executed in the first embodiment depicted in FIGS. 1 and 3(A). As illustrated in FIG. 6, this page-turning method starts with the display controller 111 causing the display 101 to display an image indicative of a designated page (s) of the electronic book 104 (step S601). The touch panel 100 follows to measure the finger touch position (step S602). The touch-position recognizing unit 121 follows to determine whether the measured finger touch position has an overlap with one of the page-turn-associated regions within the display screen (step S603).

At this moment, if the touch-position recognizing unit 121 makes an affirmative determination, that is a determination that the finger touch position has an overlap with one of the page-turn-associated regions within the display screen, then the page-turn-direction determining unit 124 determines a page turn direction according to which one of the page-turn-associated regions the finger touch position overlaps with (according to which one of the left-hand and right-hand sides the finger touch position is on) (step S604). If, however, the touch-position recognizing unit 121 makes a negative determination, that is a determination that the finger touch position has an overlap with none of the page-turn-associated regions within the display screen, then no page turn event is invoked, with the termination of this page-turning method.

It is noted that, in a case where the touch panel 100 is multi-touch-enabled (multi-point-sensible), if a plurality of page-turn-associated regions are detected which overlap with the finger's touch positions, then those regions cannot be narrowed down to one region, and so, the current page-turn-direction may be determined to be the same as a direction that was determined for a previous page turn event.

Upon completion of step S604, the pressing-force sensors 102 detect the pressing force $p_C$ with which the finger presses the touch panel 100 (step S605). The pressing-force recognizing unit 123 follows to determine whether the detected pressing force $p_C$ is equal to or larger than the predetermined threshold $p_{TH}$ (step S606).

If the pressing-force recognizing unit 123 makes an affirmative determination, that is a determination that $p_C \geq p_{TH}$ is satisfied, then the page-turn-speed determining unit 125 determines a page turn speed $v_P$ as a function of the magnitude of the pressing force $p_C$ (step S607). If, however, the pressing-force recognizing unit 123 makes a negative determination, that is a determination that $p_C \geq p_{TH}$ is not satisfied, then no page turn event is invoked, with a return to step S602.

Upon completion of step S607, the operation controller 126 starts a page turn event in the determined direction at the determined speed $v_P$ (step S608). Thereafter, the process returns to step S602 to determine whether the user has issued a request for continuing the page turn event.

<Page-Turning Method in Second Embodiment>

Figure 7:
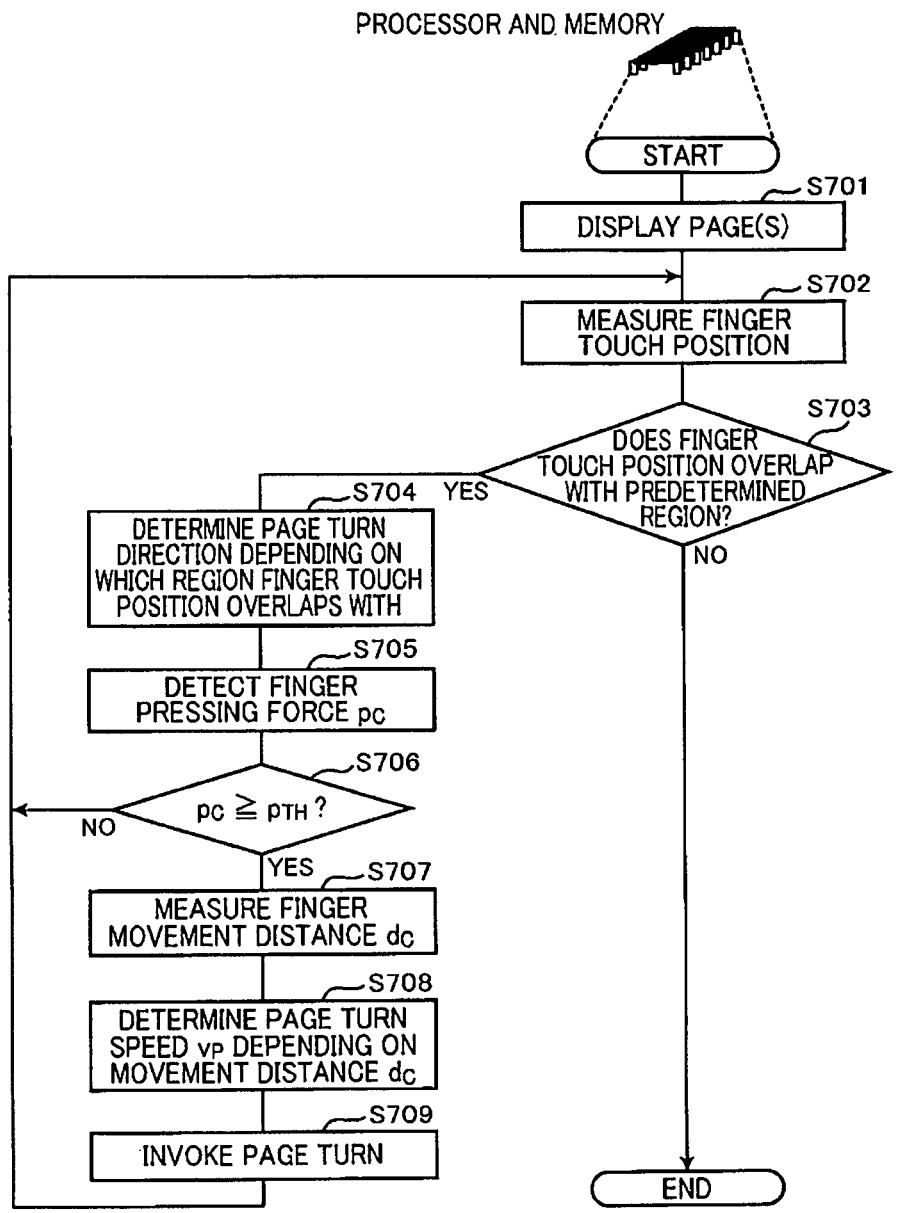
FIG. 7 is a flowchart conceptually illustrating a page-turn control program executed by a processor of the mobile information device according to the second embodiment.

FIG. 7 is a flowchart illustrating the page-turning method executed in the second embodiment depicted in FIGS. 2 and 3(B).

With reference to this flowchart, the page-turning method will be described below, but steps S701-S703, which share the same content with the corresponding steps S601-S603 in FIG. 6, will be omitted for avoiding redundant description.

As illustrated in FIG. 7, if, in step S703, the touch-position recognizing unit 121 determines that the finger touch position has an overlap with one of the page-turn-associated regions within the display screen, then the page-turn-direction determining unit 124 determines a page turn direction according to which one of the page-turn-associated regions the finger touch position overlaps with (according to which one of the left-hand and right-hand sides the finger touch position is on) (step S704).

Thereafter, the pressing-force sensors 102 detect the pressing force $p_C$ with which the finger presses the touch panel 100 (step S705). The pressing-force recognizing unit 123 follows to determine whether the detected pressing force $p_C$ is equal to or larger than the predetermined threshold $p_{TH}$ (step S706).

If the pressing-force recognizing unit 123 makes a determination that $p_C \geq p_{TH}$, then the touch-position-movement measuring unit 122 measures the movement distance $d_C$ of the finger's touch position (step S707). The page-turn-speed determining unit 125 follows to determine a page turn speed $v_P$ as a function of the measured movement distance $d_C$ (step S708). If, however, the pressing-force recognizing unit 123 does not determine that $p_C \geq p_{TH}$, then no page turn event is invoked, with a return to step S702.

Upon completion of step S708, the operation controller 126 starts a page turn event in the determined direction at the determined speed $v_P$ (step S709). Thereafter, the process returns to step S702 to determine whether the user has issued a request for continuing the page turn event.

<Page-Turning Method in Third Embodiment>

Figure 8:
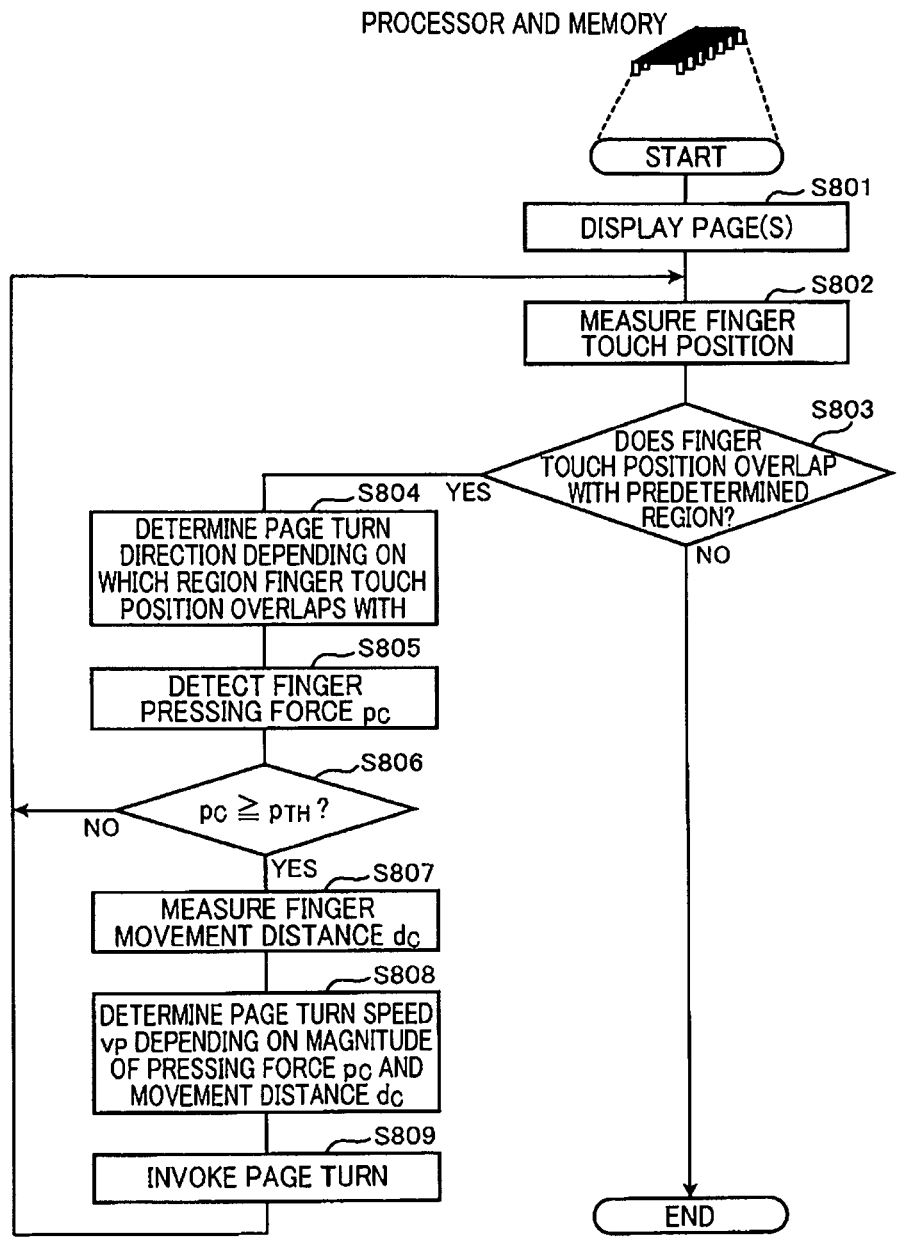
FIG. 8 is a flowchart conceptually illustrating a page-turn control program executed by a processor of the mobile information device according to the third embodiment.

FIG. 8 is a flowchart illustrating the page-turning method executed in the third embodiment depicted in FIG. 3(C). With reference to this flowchart, the page-turning method will be described below, but steps S801-S803, which share the same content with the corresponding steps S601-S603 in FIG. 6, will be omitted for avoiding redundant description.

As illustrated in FIG. 8, if, in step S803, the touch-position recognizing unit 121 determines that the finger touch position has an overlap with one of the page-turn-associated regions within the display screen, then the page-turn-direction determining unit 124 determines a page turn direction according to which one of the page-turn-associated regions the finger touch position overlaps with (according to which one of the left-hand and right-hand sides the finger touch position is on) (step S804).

The pressing-force sensors 102 follow to detect the pressing force $p_C$ with which the finger presses the touch panel 100 (step S805). Then, the pressing-force recognizing unit 123 determines whether the detected pressing force $p_C$ is equal to or larger than the predetermined threshold $p_{TH}$ (step S806).

If the pressing-force recognizing unit 123 makes a determination that $p_C \geq p_{TH}$, then the touch-position-movement measuring unit 122 measures the movement distance $d_C$ of the finger's touch position (step S807). Thereafter, the page-turn-speed determining unit 125 determines a page turn speed $v_P$ as a function of the detected pressing-force $p_C$ and the measured movement distance $d_C$ (step S808). If, however, the pressing-force recognizing unit 123 does not determine that $p_C \geq p_{TH}$, then no page turn event is invoked, with a return to step S802.

Upon completion of step S808, the operation controller 126 starts a page turn event in the determined direction at the determined speed $v_P$ (step S809). Thereafter, the process returns to step S802 to determine whether the user has issued a request for continuing the page turn event.

<Page-Turning Method in Fourth Embodiment>

Figure 9:
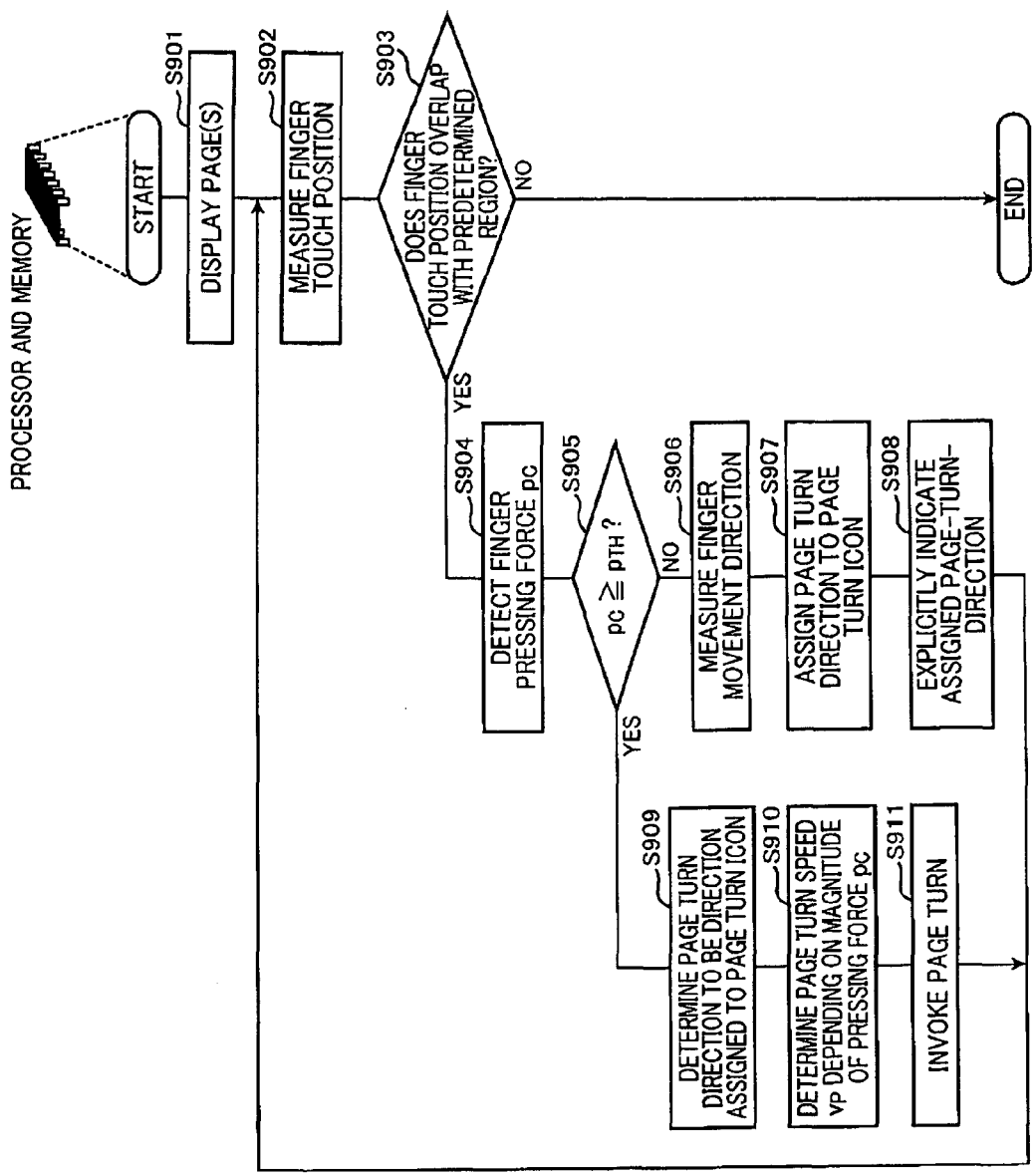
FIG. 9 is a flowchart conceptually illustrating a page-turn control program executed by a processor of the mobile information device according to the fourth embodiment.

FIG. 9 is a flowchart illustrating the page-turning method executed in the fourth embodiment depicted in FIG. 4. With reference to this flowchart, the page-turning method will be described below, but steps S901-S903, which share the same content with the corresponding steps S601-S603 in FIG. 6, will be omitted for avoiding redundant description.

As illustrated in FIG. 9, if, in step S903, the touch-position recognizing unit 121 determines that the finger touch position has an overlap with the page turn icon 108 (i.e., an example of the predetermined range) within the display screen, then the pressing-force sensors 102 detect the pressing force $p_C$ with which the finger presses the touch panel 100 (step S904). The pressing-force recognizing unit 123 follows to determine whether the detected pressing force $p_C$ is equal to or larger than the predetermined threshold $p_{TH}$ (step S905).

If the pressing-force recognizing unit 123 determines that $p_C < p_{TH}$, then the touch-position-movement measuring unit 122 measures the direction of the finger touch position movement (step S906). Thereafter, the page-turn-direction determining unit 124 assigns a page turn direction reflecting the measured direction of the touch position movement (the currently determined page-turn-direction) to the page turn icon 108 overlapping with the finger's touch position (step S907).

In this regard, the page turn icon 108 is initially assigned a default page-turn-direction which is equal to one of a page up direction and a page down direction, and, if, in step S907, the currently-determined page-turn-direction is not coincident with the page turn direction that has been assigned to the page turn icon 108 (including a direction coincident with the default page-turn-direction), then the direction assigned to the page turn icon 108 will be updated to reflect the currently-determined page-turn-direction. In addition, if the movement distance $d_C$ is below the threshold $d_{TH}$ ($d_C < d_{TH}$), then the direction assigned to the page turn icon 108 will not be updated and remain unchanged.

Subsequently, the page turn icon 108 is displayed to indicate the currently-assigned page-turn-direction (step S908). The process returns to step S902 to determine whether to invoke a page turn event.

On the other hand, if the pressing-force recognizing unit 123 determines that $p_C \geq p_{TH}$, then the page-turn-direction determining unit 124 determines a page turn direction to be the same as the direction that has been assigned to the page turn icon 108 (step S909). Then, the page-turn-speed determining unit 125 determines a page turn speed $v_P$ as a function of the magnitude of the pressing force $p_C$ (step S910).

The operation controller 126 follows to start a page turn event in the determined direction at the determined speed $v_P$ (step S911). Thereafter, the process returns to step S902 to determine whether the user has issued a request for continuing the page turn event.

As described above, the electronic-book display devices, the page-turning methods and the programs according to the embodiments of the invention allow the user to issue a page turn request by pressing the finger against the display screen in the predetermined regions (e.g., the plurality of page-turn-associated regions 105 and 106 which have their different positions within the display screen, or the single page turn icon 108, etc.). In other words, a page turn event can be invoked in response to the user's input including a press against the display screen, and, on the other hand, a press is one of the user's motions which could be caused less easily due to the user's carelessness than a touch on the display screen and a slide across the display screen, and so, these embodiments reduce the possibility that the user's incorrect inputs would cause unintended page turn events.

Additionally, these embodiments allow the user to adjust the page turn speed $v_P$ by changing the magnitude of the finger's pressing force $p_C$, the distance $d_C$ by which the finger's touch position have been moved across the display screen with the finger in pressing contact with the display screen, or both. This helps the user to turn a desired number of pages accurately and quickly, even with the finger used for manipulation being held onto the display screen (without releasing the finger that is in contact with the display screen, from the display screen).

While some of embodiments of the present invention have been described above in detail with reference to the drawings, they are just examples, and the present invention may be embodied in alternative modes, which begin with the modes described in the section titled "Summary of the Invention," or which are obtained by making various modifications and improvements to the above-described embodiments, in view of the knowledge of those skilled in the art.

The invention claimed is:

1. A display device for successively displaying a plurality of pages of an electronic medium by one or more pages each time on a display screen, and turning the pages on the display screen in response to a user's input via finger touch of the display screen, the display device comprising:
   a pressing-force sensor configured to detect a pressing force with which the finger is pressed against the display screen;
   a display controller configured to display on the display screen a page turn icon to which the page turn direction is dynamically assigned, to allow the page turn icon to visualize the assigned page turn direction;
   a page-turn-direction determining unit configured to be activated in response to an event occurring in which the finger is touched on the display screen with the pressing force below a predetermined threshold, and movement of the finger is performed on the display screen in touch therewith, to determine a page turn direction in which the pages are to be turned on the display screen, so as to reflect a direction of the movement of the finger, and assign the determined page turn direction to the page turn icon; and
   an operation controller configured to be activated in response to an event occurring in which the finger is pressed against the display screen with the pressing force equal to or larger than the predetermined threshold, to authorize initiation of a page turn event for turning the pages on the display screen in the page turn direction visualized by the page turn icon displayed on the display screen.

2. The display device according to claim 1, further comprising a page-turn-speed determining unit configured to determine a page turn speed at which the pages are to be turned on the display screen, as a function of a magnitude of the detected pressing force,
   wherein the operation controller is configured to authorize initiation of a page turn event for turning the pages on the display screen at the determined page-turn-speed.

3. The display device according to claim 1, further comprising a fold-line display controller configured to be activated in response to an event occurring in which the finger touch position has an overlap with a region that is located in the vicinity of a top corner of the displayed page on the display screen, and that is remote from a predetermined at least one region of the display screen, and in which the detected pressing force is determined to be equal to or larger than the predetermined threshold or a predetermined second threshold, to cause a fold line to be displayed at the top corner of the displayed page.

4. A method of turning pages in a display device for successively displaying a plurality of pages of an electronic medium by one or more pages each time on a display screen, and turning the pages on the display screen in response to a user's input via finger touch of the display screen, the method comprising:
   detecting a pressing force with which the finger is pressed against the display screen;
   displaying on the display screen a page turn icon to which the page turn direction is dynamically assigned, to allow the page turn icon to visualize the assigned page turn direction;
   in response to an event occurring in which the finger is touched on the display screen with the pressing force below a predetermined threshold, and movement of the finger is performed on the display screen in touch therewith, determining a page turn direction in which the pages are to be turned on the display screen, so as to reflect a direction of the movement of the finger, and assigning the determined page turn direction to the page turn icon; and
   in response an event occurring in which the finger is pressed against the display screen with the pressing force equal to or larger than the predetermined threshold, authorizing initiation of a page turn event for turning the pages on the display screen in the page turn direction visualized by the page turn icon displayed on the display screen.

5. A method of successively displaying a plurality of pages of an electronic medium by one or more pages each time on a display screen, and turning the pages on the display screen in response to a user's input via finger touch of the display screen, the method comprising:
   displaying on the display screen a page turn icon to which the page turn direction is dynamically assigned, to allow the page turn icon to visualize the assigned page turn direction;
   in response to a user's soft touch on the display screen with the finger with an intensity of touch below a predetermined value, and the user's finger slide on the display screen while maintaining the soft touch, selecting a page turn direction in which the pages are turned on the display screen, so as to reflect a direction of the finger's slide, and assigning the determined page turn direction to the page turn icon; and in response to a user's hard touch on the display screen with the finger with the intensity of touch above the predetermined value, authorizing initiation of a page turn event for turning the pages on the display screen in the page turn direction visualized by the page turn icon displayed on the display screen.

6. The method according to claim 5, further comprising:
determining a page turn speed at which the pages are turned on the display screen, based on at least one of the intensity of touch, and a distance over which the user has slid the finger across the display screen; and turning the pages on the display screen in the selected page-turn-speed.

7. A non-transitory computer-readable storage medium storing executable instructions that, when executed, cause a computer to perform the method according to claim 4.

8. The display device according to claim 1, wherein the page-turn-direction determining unit is further configured to be activated in response to an event occurring in which the movement of the finger is performed on the display screen in touch therewith within a displayed region of the page turn icon on the display screen, with the pressing force below the predetermined threshold, to determine the page turn direction so as to reflect the direction of the movement of the finger, and assign the determined page turn direction to the page turn icon.

9. The method according to claim 5, wherein the operation of selecting the page turn direction includes, in response to an event occurring in which the movement of the finger is performed on the display screen in touch therewith within a displayed region of the page turn icon on the display screen, with the pressing force below the predetermined threshold, determining the page turn direction so as to reflect the direction of the movement of the finger, and assigning the determined page turn direction to the page turn icon.

10. The display device according to claim 1, wherein the page turn icon includes a visual indication that directly indicates the assigned page-turn-direction.

11. The display device according to claim 1, wherein the page turn icon includes a visual indication that suggestively indicates the assigned page-turn-direction by allowing the user to visually identify the page turn direction by a symbol, a character, a character set, a triangle, an arrow or a figure.

12. The method according to claim 4, wherein the page turn icon includes a visual indication that directly indicates the assigned page-turn-direction.

13. The method according to claim 4, wherein the page turn icon includes a visual indication that suggestively indicates the assigned page-turn-direction by allowing the user to visually identify the page turn direction by a symbol, a character, a character set, a triangle, an arrow or a figure.

14. The method according to claim 5, wherein the page turn icon includes a visual indication that directly indicates the assigned page-turn-direction.

15. The method according to claim 5, wherein the page turn icon includes a visual indication that suggestively indicates the assigned page-turn-direction by allowing the user to visually identify the page turn direction by a symbol, a character, a character set, a triangle, an arrow or a figure.

16. A non-transitory computer-readable storage medium containing software for causing a computer to perform the method according to claim 5.

17. A display device for successively displaying a plurality of pages of an electronic medium by one or more pages each time on a display screen, and turning the page on the display screen in response to a user's input via finger touch of the display screen, the display device comprising:

a display controller configured to display on the display screen a page turn icon to which the page turn direction is dynamically assigned, to allow the page turn icon to visual the assigned page turn direction except for any not-assigned page turn directions;

a page-turn-direction determining unit configured to be activated in response to a user's first action that allows the finger to be touched on the display screen and to be moved on the display screen in touch therewith, to determine a page turn direction in which the pages are to be turned on the display screen, so as to reflect a direction of the movement of the finger, and assign the determined page turn direction to the page turn icon; and an operation controller configured to be activated in response to a user's second action that is distinct from the first action, and includes the user's press on the display screen with a pressing force exceeding a threshold, to authorize initiation of a page turn event for turning the pages on the display screen in the page turn direction visualized by the page turn icon displayed on the display screen.

18. A method of successively displaying a plurality of pages of an electronic medium by one or more pages each time on a display screen, and turning the page on the display screen in response to a user's input via finger touch of the display screen, the method comprising:

displaying on the display screen a page turn icon to which the page turn direction is dynamically assigned, to allow the page turn icon to visualize the assigned page turn direction except for any not-assigned page turn directions;

in response to a user's first action that allows the finger to be touched on the display screen and to be moved on the display screen in touch wherewith, selecting a page turn direction in which the pages are turned on the display screen, so as to reflect a direction of the movement of the finger, and assigning the determined page turn direction to the page turn icon;

in response to the user's second action that is distinct from the first action, and includes the user's press on the display screen with a pressing force exceeding a threshold, authorizing initiation of a page turn event for turning the pages on the display screen in the page turn direction visualized by the page turn icon displayed on the display screen.

19. A non-transitory computer-readable storage medium containing software for causing a computer to perform the method according to claim 18.

* * * * *